Nov. 14, 1961  H. E. CONNER ET AL  3,009,017
LAMINATED TELEVISION SCREEN
Filed May 22, 1953  2 Sheets-Sheet 1
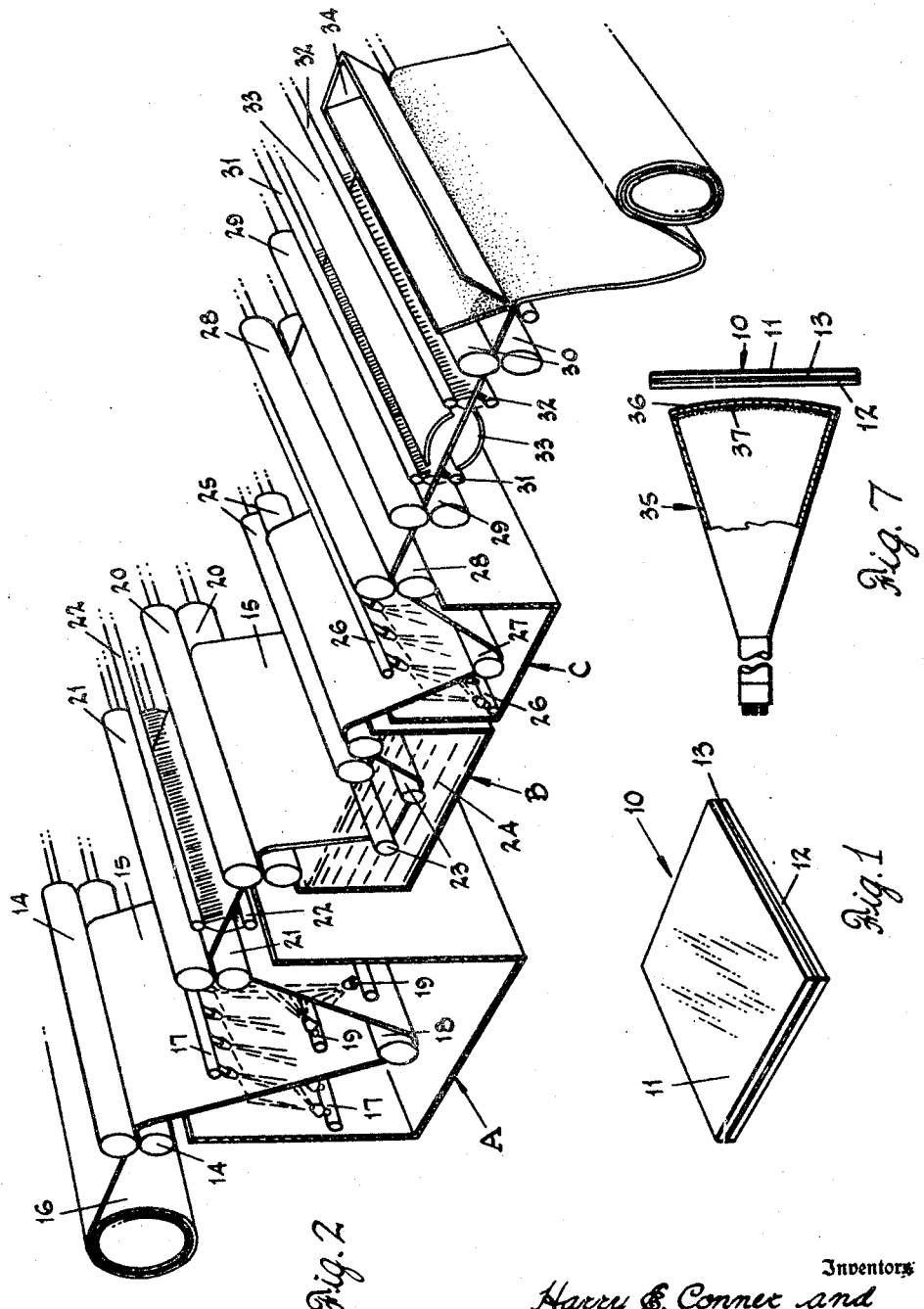
Inventors
Harry E. Conner and
Paul P. Mattimoe
By Nobbe & Swope Attorneys

United States Patent Office 3,009,017
Patented Nov. 14, 1961

3,009,017
LAMINATED TELEVISION SCREEN
Harry E. Conner and Paul T. Mattimoe, Toledo, Ohio, assignors to Libbey-Owens-Ford Glass Company, Toledo, Ohio, a corporation of Ohio
Filed May 22, 1953, Ser. No. 356,684
12 Claims. (Cl. 178—7.85)

The present invention relates broadly to laminated glass structures, and is more particularly concerned with a laminated glass light filter suitable for use as an implosion plate in television receivers.

It is an important aim of the present invention to provide a television screen which grants improved contrast to television images in either a bright or darkened room, and which also imparts to said images substantially increased clarity and definition.

Another object of the invention is to provide a television screen which is characterized by its substantial freedom from objectionable light scattering effects, and which is possessed of no coloration which deleteriously alters the picture and reflection coloration.

Another object of the invention lies in the provision of a television screen having improved attenuation in the maximum light output regions of the television tube and improved attenuation in other spectral regions.

A further object of the invention is to provide a light filter for television screens which substantially reduces glare and eye strain, and which comprises one or more glass sheets and a plastic interlayer treated with a suitable dyestuff to impart to said filter the foregoing noted improved characteristics.

A further object of the invention is to provide a laminated television screen having a plastic interlayer securing a pair of glass sheets in unitary relation, which interlayer preferably has an index of refraction substantially the same as that of the glass and which is dyed with a substance which imparts fast and clear color to the interlayer.

A still further object of the invention lies in the provision of a method of producing laminated television screens comprising dyeing a plastic interlayer with a suitable dyestuff, assembling the interlayer between sheets of glass, and applying heat and pressure to the assembly to bond the same into a composite structure.

Other objects and advantages of the invention will become more apparent during the course of the following description when taken in connection with the accompanying drawings.

In the drawings wherein like numerals are employed to designate like parts throughout the same:

FIG. 1 is a perspective view of a laminated television screen of this invention;

FIG. 2 is a diagrammatic perspective view of apparatus suitable for dyeing plastic sheeting employed as the interlayer in the present screen;

FIG. 7 is a diagrammatic view showing the television screen positioned in front of a cathode ray tube.

Figure 3:
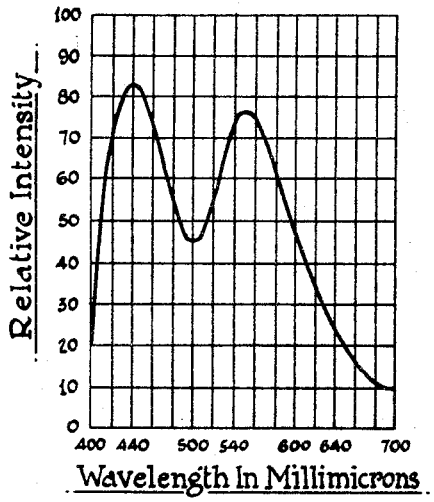
FIG. 3 is a curve showing the light output of the phosphor which is used in many commercial television picture tubes.

In accordance with the present invention, a light filter or viewing screen for television receivers is provided comprising one or more sheets of a transparent material such as glass, either clear or tinted, and a plastic layer bonded thereto, said layer being preferably formed of a thermoplastic resinous material such as polyvinyl butyral which has been treated with a solution which may comprise an alcohol, water, and a molecularly dispersed organic dyestuff such as Capracyl Black N with or without additives, which may be Capracyl Blue G or Anthraquinone Blue SWF. Dependent upon the composition and concentration of the dye solution, as well as on the duration of the dyeing operation, light filters may be produced which have a total visible luminous transmittance (I.C.I. Ill. A) ranging between 30 and 80%, and a haze factor of not more than one percent. Although it is believed that the noted dyestuffs are molecularly dispersed, it is of course possible, depending upon the concentration of solution, temperature, and type of solvents, that they be associated to a greater or lesser degree.

While experience has indicated thta one or more of the foregoing noted dyestuffs produces the desired light transmittance characteristics, as well as a substantial increase in picture clarity, it will be appreciated that other dye substances may at times be found particularly suitable. Thus, while each of the noted substances is well adapted to the present process by virtue of its water soluble and water-alcohol soluble nature, oil (organic solvent) soluble type dyestuffs having the proper spectral characteristics are also of considerable practical importance.

The Capracyl Black N and Blue G dyestuffs which have been found particularly suitable to accomplish the purposes of the present invention are neutral dyeing metallized azo dyes. Capracyl Black N is listed in the "Technical Manual of the American Association of Textile Chemists and Colorists," vol. XXXV, part 5, 1959 edition on page 244, right-hand column line 32; and the color index number of Capracyl Blue G is "Acid Blue 165." Anthraquinone Blue SWF is identified as prototype Number 12 (Color Index No. Acid Blue 25).

With reference now to the drawings, there is shown in FIGURE 1 thereof a laminated television screen or light filter, designated in its entirety by the numeral 10, which comprises a pair of glass sheets 11 and 12 and a plastic interlayer 13 bonded under heat and pressure to the inner face of each of said glass sheets. The glass forming said sheets is preferably that often referred to as ordinary clear sheet glass, although in cetrain instances it may be found desirable to employ a tinted glass characterized by a somewhat different chemical composition. Ordinary sheet glass, preferably of double strength weight, and having no perceptible color is, however, effective to accomplish the purposes of this invention. Glass of this type has a general composition approximating 72.80% $SiO_2$, 0.15% $Fe_2O_3$, 0.90% $Al_2O_3$, 0.50% $TiO_2$, 8.50% CaO, 3.60% MgO, 13.10% $Na_2O$, 0.08% $K_2O$, 0.30% $SO_3$, and 0.07% $As_2O_3$. A typical tinted glass, which provides in a television screen relatively high attenuation in the red region of the spectrum, produces upon analysis a composition which varies around 72.50% $SiO_2$, 0.50% $Fe_2O_3$, 0.80% $Al_2O_3$, 0.30% $TiO_2$, 8.90% CaO, 3.40% MgO, 13.20% $Na_2O$, 0.10% $K_2O$, and 0.30% $SO_3$. Regardless of the particular composition of the sheet glass, however, it is desirable for strength purposes that the glass thickness be around 0.25 inch. Also, it may at times be preferred for optical reasons to employ plate glass rather than sheet glass.

The plastic interlayer 13 of the light filter 10 is preferably formed of polyvinyl butyral resin, and as examples of materials which have been found particularly suitable are those designated as "Saflex," manufactured and sold by Monsanto Chemical Co., "Butacite" by E. I. du Pont de Nemours and Co., and "Vinal" by Carbide and Chemicals Corp. As employed between the glass sheets 11 and 12, or when laminated to the face of a television receiver tube, the interlayer 13 preferably comprises 100 parts by weight of polyvinyl butyral resin and either 41 parts by weight of tri-ethylene glycol di-hexoate or 40 parts by weight of dibutoxyethyl adipate. With the latter compound in the amount indicated the resin contains 29% of plasticizer, and with the former, 28.6% of plasticizer. Resinous materials other than polyvinyl butyral may of course be used, such as for example, polyvinyl formal and acetal.

Dyeing of the plastic interlayer to a neutral gray color sufficient to produce when laminated with two sheets of glass a total visible light transmittance ranging between 30 and 80% and a haze value normally less than one percent is accomplished on apparatus of the character shown in FIGURE 2. The continuous dyeing machine illustrated therein preferably comprises a primary wash section A, a dyeing section B, and a rinse or secondary wash section C. Positioned adjacent the section A is a pair of drive rolls 14 which draws plastic sheeting 15 from a supply roll 16 into the wash section A between hot water sprays 17 and beneath an idler roll 18. The sheeting 15 is then drawn upwardly between cold water sprays 19 by means of a pair of drive rolls 20, and a large portion of the excess water on said sheeting is removed by a pair of wringer rolls 21 adjacent which are compressed air jets 22 for substantially drying the now thoroughly washed sheeting 15. Idler rolls 23 are provided adjacent the base of the dyeing section B and the sheeting passes beneath said rolls and through the dye solution 24 prior to its movement upwardly and between an additional pair of wringer or squeegee rolls 25 which are partially immersed in said solution.

Thereafter the sheeting 15 continues into the rinse or secondary wash section C wherein there are located cold water sprays 26 directed at opposite surfaces of the dyed sheeting and an idler roll 27 under which the plastic material passes prior to being drawn upwardly between spaced pairs of wringer rolls 28 and 29 by the drive rolls 30. Two spaced pairs of compressed air jets 31 and 32 are located forwardly of said drive rolls, and positioned between said pairs of jets are electric radiant heaters 33 which operate to reduce the dye solution solvent which has been absorbed into the sheeting. A trough of dusting material 34, such as sodium bicarbonate, is provided in the path of the moving plastic material, and after being dusted, said material is rolled up into a form suitable for cutting into sizes for use as an interlayer in the present invention. Thereafter the plastic is oven-dried to remove last traces of solvent, is then festooned and cut, and is next rapidly washed to remove the sodium bicarbonate dusting powder.

In the operation of the foregoing described apparatus the dyeing procedure is preferably initiated by first turning on the water sprays 17 in the wash section A and feeding the plastic sheeting into the dyeing machine. Dye solution 24 is then pumped into the dye section B to a level sufficient to partially immerse the pair of squeegee rolls 25 located at the exit end of the dye bath or section B. A supply of water to the rinse section C and compressed air to the jets 22, 31 and 32 is then furnished, and the radiant heaters 33 and motor means (not shown) operating the drive rolls 14, 20, 29 and 30 turned on. Tension is maintained on the platsic, and wrinkling thereof avoided as it passes through the wash sections A and C, by operating the drive rolls 14 at a speed generally about 5% slower than the squeegee or wringer rolls 21, and by maintaining substantially the same relation between the rolls 20, 23 and 25 and the wringer rolls 28 and 29. It has also been found important that the dye solution 24 be maintained at a constant level in contact with the wringer rolls 25 throughout the operation, and that uniform and complete coverage of the plastic sheeting 15 by the cold water sprays 26 in the rinse section C be accomplished in order to remove excess dye solution and absorbed alcohol from said sheeting.

Plastic sheeting dyed in accordance with the disclosed procedure has, when laminated by conventional techniques under heat and pressure between sheets of either clear or tinted glass, a total visible light transmittance (hereinafter referred to as TVLT) with Illuminant A of between 30 and 80%, and a haze factor or light scattering characteristic of substantially less than one percent, the TVLT being dependent upon the composition and concentration of the dye solution, and the speed of passage of the sheeting through the dyeing procedure. The total visible luminous transmittance of the television screen herein disclosed is preferably determined by optical bench measurements on the unlaminated dyed plastic since experience has indicated that the transmittance value for the dyed plastic alone seldom varies more than one percent from the TVLT of the laminated screen itself when employing ordinary sheet glass. Rather than determining the total transmittance by optical bench methods, it will of course be appreciated that Illuminant A total transmittance may be calculated from the spectral transmission curve of the dyed plastic determined by a spectrophotometer before or after lamination with glass sheets. The haze value, on the other hand, depends largely on the nature and composition of the plastic itself, and is readily determined in accordance with A.S.T.M. Designation: D1003–49T.

Since, on the average, undyed polyvinyl butyral plastic when laminated between two clear glass sheets of the exemplary composition earlier noted produces a structure having a total transmittance (TVLT—Ill. A) of around 89.5%, and when laminated between tinted glass sheets of the exemplary composition also noted, results in a laminate having a TVLT—Ill. A of approximately 74.0%, it will be readily seen by the following illustrative examples as to the extent to which the total transmittance is reduced and substantial improvement in light contrast and picture definition accomplished.

*Example 1*

A sheet of polyvinyl butyral having a plasticizer content of approximately 29% was dip dyed for 6½ minutes at 75° F. in a dye bath containing 2.5 grams of Capracyl Black N dyestuff dissolved in one liter of a solvent composed of 60 parts by volume of ethyl alcohol and 40 parts by volume of distilled water. A neutral color was produced in the plastic, and optical measurements indicated the plastic had a total visible light transmittance (TVLT) of 43% and a haze factor of 0.9%. The plastic was then laminated between single sheets of double strength sheet glass.

*Example 2*

A sheet of the same type of plastic was dip dyed for 6½ minutes at 75° F. in a blended dye bath of two parts by volume of Capracyl Black N as in Example 1 plus one part by volume of blue composed of 2.5 grams of Capracyl Blue G, dissolved in one liter of the same solvent used in the above example. The plastic had a neutral blue color, and a TVLT of 42% and a haze factor of 0.6%. It was then laminated as above.

*Example 3*

A sheet of the same type of plastic was dip dyed for 6½ minutes at 75° F. in a blended dye bath containing 2 parts of black to 3 parts of blue by volume. The black bath contained 2.5 grams of Capracyl Black N dyestuff dissolved in one liter of a solvent composed of 60 parts by volume of ethyl alcohol and 40 parts by volume of water. The blue bath was prepared in the same concentration and solvent system with Capracyl Blue G dyestuff. Upon measurement the plastic had a TVLT of 45% and a haze factor of 0.5%. A laminate was then produced as previously.

*Example 4*

A plastic sheet dyed in the same manner as in the first example was laminated between two sheets of a tinted glass having substantially the exemplary composition earlier noted. A product resulted having a TVLT of 38% and a haze factor of 0.6%.

Example 5

A plastic sheet dyed in the same manner as in the second example was laminated between two sheets of a tinted glass as above. The laminate thus formed had a TVLT of 37% and a haze factor of 0.5%.

Example 6

A plastic sheet dyed in the same manner as in the third example was laminated between two sheets of a tinted glass as above. It was found that the laminate had a TVLT of 37% and a haze factor of 0.8%.

Example 7

A sheet of polyvinyl butyral resin manufactured and sold by Monsanto Chemical Co., under the name "Neutralite," and which has carbon black pigment dispersed within the plastic itself, was laminated between sheets of a tinted glass. It was noted that the laminate had a TVLT of 48.5% and a haze factor of 2.37%.

Example 8

The same type plastic as in the last example was laminated between two pieces of clear sheet glass. Optical measurements on the laminate produced a TVLT of 57.6% and a haze factor of 1.5%.

Example 9

A sheet of monolithic methyl methacrylate plastic proposed for television screens and having a thickness of 0.0575 inch, as compared to 0.015 inch in the last two examples, was examined and found to have a TVLT of 44.0% and a haze factor of 3.7%.

Example 10

A sheet of the same type polyvinyl butyral resin as in the first six examples was dip dyed for one minute at 75° F. in a dye bath containing 2.5 grams Capracyl Black N dyestuff dissolved in one liter of solvent composed of 60 parts by volume of ethyl alcohol and 40 parts by volume of distilled water. The dyed plastic was rinsed with water and noted to be of a neutral shade. It was found to have a TVLT of 55% and a haze factor of 0.3%. The sheeting was then laminated with sheets of tinted glass.

Example 11

A sheet of the same type of plastic was dyed and rinsed in the same manner as in Example 10. The dye bath was of the following composition: Five parts by volume of a black bath containing 2.5 grams Capracyl Black N dissolved in one liter of a solvent composed of 60 parts by volume of denatured ethyl alcohol and 40 parts by volume of water plus one part by volume of a blue bath prepared with Anthraquinone Blue SWF dyestuff in the same concentration and solvent system. The TVLT of the resinous layer was 57% and the haze factor 0.35%. A laminate was formed as above.

Example 12

The same type plastic as above was dyed with the same solution as Example 10, the dyeing time being increased to two minutes in the bath. It was noted that doubling the dip time decreased the TVLT to 50% and the haze factor was 0.25%. A laminate of the same structure as above was made.

Example 13

The same procedure as in the last example was followed in the dyeing of polyvinyl butyral resin with the dye solution of Example 11. The increase in dipping time reduced the TVLT to 51% and the dyed plastic had a haze factor of 0.3%. A tinted glass was used in making a laminate.

Example 14

Polyvinyl butyral sheeting was dipped for one minute at 75° F. in a Capracyl Black N dye bath of the following composition: Two and one-half grams of dyestuff dissolved in one liter of solvent composed of 60 parts by volume of ethyl alcohol and 40 parts by volume of water. The dyed sheeting was found to have a TVLT of 64.5% and a haze factor of less than 1%.

Example 15

A dye solution was prepared containing a mixture of sixty gallons of denatured ethyl alcohol and forty gallons of distilled water, to which was added with stirring 4125 grams of Capracyl Black N dyestuff. Stirring was continued for approximately thirty minutes after the addition, and the solution transferred to stainless steel drums and allowed to stand for about eighteen hours before being used.

The solution as thus prepared was thereafter pumped into the dye section B illustrated in FIGURE 2 of the drawings, and the disclosed apparatus operated in the manner described. Experience has indicated that when the dye machine is regulated to feed five linear feet of plastic per minute therethrough, and the solution is prepared as above, the total visible light transmittance (III. A) of the dyed sheeting will continuously remain at 42.5% plus or minus 3.0%, and that the haze factor will be in the neighborhood of 0.25 and 0.35%.

It may thus be seen from the foregoing illustrative examples that a plastic interlayer for use in television screens may be produced having substantially any particular light transmittance for any specific television tube by accurate control of the composition and concentration of the dye solution, by careful regulation of the rate of feed or time absorbed in passing the plastic through the dye bath, and by selection of the desired type of glass used in the laminate. Further, when combined with sheets or plates of glass, the plastic may be laminated to any desired thickness with an increase in the safety factor by merely using a plastic interlayer of greater thickness, as for example, to 0.045 inch, or by increasing the number of layers of 0.015 inch plastic. By this means a substantial advantage accrues over presently used implosion plates of tempered plate glass.

It will also be appreciated that while water and water-alcohol soluble dyestuffs are preferred, oil soluble type dyestuffs of the proper spectral characteristics may also be employed. And since, in using the latter dyestuffs in the dip-dyeing process disclosed we have found that the dye solvent attacked the plastic interlayer and removed substantial quantities of plasticizer from the interlayer, we prefer the use of a silk screening or printing process. Here the oil soluble type dyestuff is dissolved in a plasticizer or solvent plasticizer mixture and then applied to the surface of the sheeting using silk screens or printing rolls. However, when the dyestuff is applied by either of these two methods, it is left in discreet particles on the surface of the sheet plastic, and it has therefore been found necessary to heat the plastic subsequent to the application of the dyestuff in order to accomplish diffusion of the dyestuff uniformly throughout the body of the interlayer sheet material.

Figure 4:
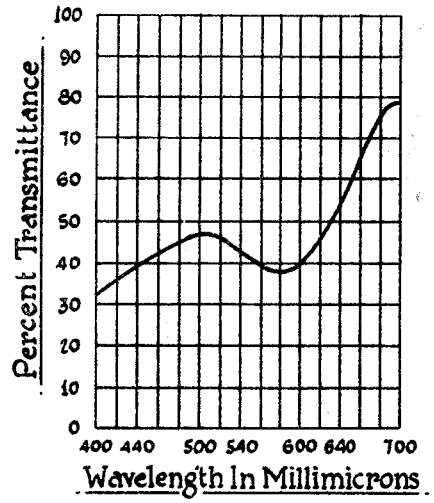
FIGS. 4, 5 and 6 are spectral transmittance curves of typical television screens embodying the features of the invention herein disclosed.

To illustrate the variations which may be accomplished in light transmittances, there is shown in FIGURE 3, a curve of the light output of the P4 phosphor which is used in many of the commercial television picture tubes. From this it may be seen that the particular phosphor plotted peaks or has its maximum light output at slightly less than 440 millimicrons or 4400 Angstrom units when the relative intensity or energy is between 82 and 83, and at about 550 millimicrons or 550 Angstrom units when the relative intensity is about 78. Comparing this with the curve of FIGURE 4, which shows the spectral transmittance for the light filter produced in accordance with the procedure of Example 2 above, it will be seen that said screen has a transmittance of about 39% at 440 millimicrons and about 41.5% at 550 millimicrons, the peaks of the P4 phosphor. It therefore attenuates well in the maximum output regions, and has a TVLT of 42% which is effective for the desired improvement in image contrast and clarity, as well as picture definition.

Figure 5:
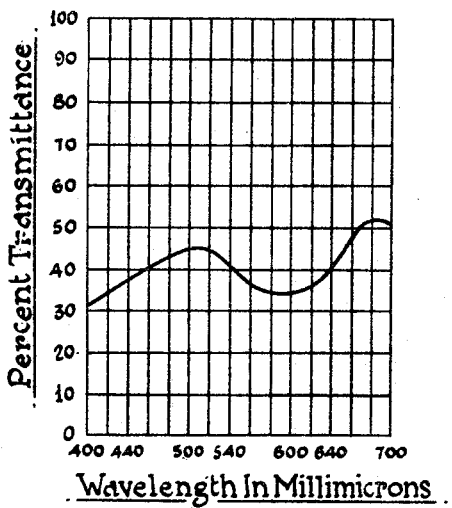

FIGURE 5 plots the spectral transmittance of a television screen which has been manufactured according to Example 4. It will be noted that this screen has a 37.5% transmittance at about 440 millimicrons and substantially the same transmittance at about 550 millimicrons, the peaks of the same phosphor tube as shown in FIG. 3. As was brought out in this particular example, the screen had a total visible transmittance of 38% and a haze factor of 0.6%. Since the dyed plastic was laminated between two sheets of tinted glass, such as screen possesses a high attenuation in the red regions of the spectrum.

Figure 6:
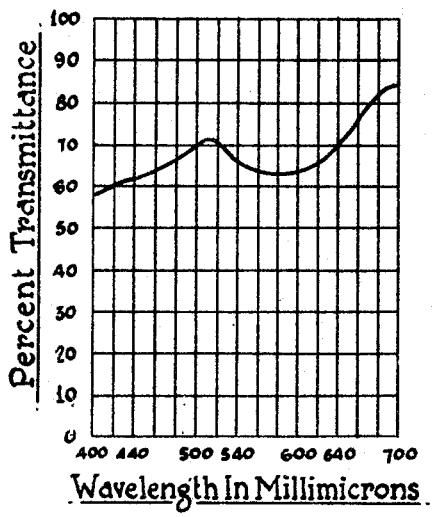

FIGURE 6 illustrates a curve of wavelength plotted against percent transmittance for a screen produced in accordance with Example 14 and which has a TVLT of 64.5%. It may be seen that such a screen has a transmittance of 61.4% at 440 millimicrons and 63.7% at 550 millimicrons. It has been found to have particular utility in connection with television picture tubes which have a light output slightly lower than that of the tube plotted in FIGURE 3.

The P4 phosphor screen, designated as such by the Radio Manufacturer's Association to indicate its use in monochrome (black and white) television, is considered to be a two-component screen comprising a blue-emitting and a yellow emitting phosphor. For this purpose, most unaluminized P4 screens for direct viewing kinescopes presently comprise admixed hex.-ZnS:Ag (blue component) and hex.-ZnS(47) CdS(53):Ag (yellow component). These two sulphide phosphors have closely matched emission characteristics as a function of cathode ray current density, and screens made of the two phosphors give uniform white emission in image half-tones and high lights.

To our knowledge there are three cathode ray tube screens which have been coded by the Radio Manufacturer's Association as P4 phosphor screens and with which the present invention is of particularly important application. The first, which may be referred to as P4($a$), is understood to be formed of a mixture of hex.-ZnS: Ag(0.015) and hex.-1.3 ZnS·CdS:Ag(0.01). The second, P4($b$), presumably consists of hex.-ZnS:Ag(0.015) or a mixture of cub.-ZnS:Ag(0.003-0.01) and rbhdl.-$Zn_8BeSi_5O_{19}$:Mn(1.4). The third, P4($c$), is understood to comprise as the representative phosphor monocl.-Ca Mg$(SiO_3)_2$:Ti(1) plus rbhdl.-$Zn_8BeSi_5O_{19}$:Mn(1.4).

Each of the foregoing P4 phosphors not only differ in composition but has slightly different peaks or regions of maximum light output. Thus, the P4($a$) phosphor with which we are most familiar and the light output curve of which is plotted in FIG. 3 of the accompanying drawings, peaks at about 4400 and 5500 Angstrom units, while the P4($b$) and P4($c$) phosphors peak at about 4600 and 5400 Angstroms and 4000 and 5400 Angstrom units, respectively.

Since each of the noted P4 phosphors have particular utility in television kinescopes of the monochrome type and emit white light both before and after excitation, with the exception of the P4($b$) type which emits green-yellow light after excitation only, the present invention is of application to cathode ray tubes utilizing either of these representative phosphors. Thus, laminated television screens of the character herein disclosed will be found to attenuate well and to provide improved picture clarity with cathode ray tubes which have regions of maximum light output between 400 and 480 millimicrons and between 500 and 580 millimicrons.

A cathode ray tube of the above character for television receivers is illustrated in FIGURE 7, and upon reference thereto, it will be noted that said tube 35 is provided with a picture face 36 carrying on its inner surface a phosphor coating 37. To accomplish the purposes of the present invention, the viewing screen or light filter 10 herein disclosed is positioned in front of and closely adjacent to the picture face 36. If desired, the plastic interlayer 13 provided between the glass sheets 11 and 12 of said screen 10 may be formed of a plurality of plastic sheets, one or more of which may be dyed as above described and one or more of which may be of substantially clear undyed plastic.

It is to be understood that various modifications may be made in the compositions and procedures herein disclosed without departing from the spirit and scope of the invention as defined in the appended claims.

We claim:

1. In a television receiver, a cathode ray tube provided with a picture face carrying a phosphor coating, and a viewing screen spaced in front of and closely adjacent to said picture face, said phosphor coating being a member of the group consisting of a mixture of $$hex.-ZnS:Ag(0.015)$$

and hex.-1.3 ZnS·CdS:Ag(0.01), hex.-ZnS:Ag(0.015), a mixture of cub.-ZnS:Ag(0.003-0.01) and $$rbhdl.-Zn_8BeSi_5O_{19}:Mn(1.4)$$

and $$monocl.-CaMg(SiO_3)_2:Ti(1)$$

plus $$rbhdl.-Zn_8BeSi_5O_{19}:Mn(1.4)$$

said viewing screen carrying an organic dye stuff of the neutral dyeing metallized azo dye type.

2. In a television receiver of the character defined in claim 1, in which said viewing screen comprises a sheet of glass and a sheet of dyed plastic material bonded to said glass sheet, said plastic material carrying the azo dye.

3. In a television receiver of the character defined in claim 2, in which the dyed sheet of plastic material has regions of minimum visible light transmittance between 400 and 460 millimicrons and between 520 and 560 millimicrons.

4. In a television receiver, a cathode ray tube provided with a picture face carrying a phosphor coating having two regions of maximum light output, one between 400 and 480 millimicrons and one between 500 and 580 millimicrons, and a viewing screen spaced in front of and closely adjacent to said picture face, said viewing screen comprising a sheet of glass and a sheet of plastic material colored a neutral gray with a metallized azo dyestuff, said colored plastic sheet having a total visible luminous transmittance (I.C.I. Ill. A) effective to attenuate the white light emitted by said tube within both the maximum light output regions of said phosphor to provide better image contrast and clarity as well as picture definition.

5. In a television receiver of the character defined in claim 4, in which the plastic sheet has been colored a neutral gray with a solution which includes Capracyl Black N dyestuff.

6. In a television receiver of the character defined in claim 4, in which the plastic sheet has been colored a neutral gray with a solution which includes Capracyl Black N dyestuff and a dyestuff selected from the group consisting of Capracyl Blue G dyestuff and Anthraquinone Blue SWF dyestuff.

7. A sheet of transparent plastic material for use as a viewing screen in a television receiver carrying an organic dyestuff of the neutral dyeing metallized azo dye type.

8. A sheet of polyvinyl butyral carrying an organic dyestuff of the neutral dye metallized azo dye type for use as a viewing screen in a television receiver.

9. In a television receiver having a cathode ray tube provided with a picture face carrying a phosphor coating, said phosphor coating being a member of the group consisting of a mixture of hex.-ZnS:Ag(0.015) and hex.-1.3 ZnS·CdS:Ag(0.01); hex.-ZnS:Ag(0.015) or a mixture of cub. - ZnS:Ag(0.003–0.01) and rbhdl. - $Zn_8BeSi_5O_{19}$:Mn (1.4); and monocl. - $CaMg(SiO_3)_2$:Ti(1) plus rbhdl.- $Zn_8BeSi_5O_{19}$:Mn(1.4), the improvement of a viewing screen spaced in front of and closely adjacent to said picture face, said viewing screen comprising a sheet of glass and a sheet of plastic material bonded to said sheet of glass, said plastic material being colored a neutral grey with a metallized azo dyestuff, said colored plastic sheet having a total visible luminous transmittance (I.C.I. Ill. A) effective to attenuate the white light emitted by said tube within both the maximum light output regions of said phosphor to provide better image contrast and clarity as well as picture definition.

10. In a television receiver of the character defined in claim 9, in which the dyed sheet of plastic material has regions of minimum visible light transmittance between 400 and 460 millimicrons and between 520 and 560 millimicrons.

11. In a television receiver of the character defined in claim 9 in which the plastic sheet has been colored a neutral grey with a solution which includes Capracyl Black N dyestuff.

12. In a television receiver of the character defined in claim 9 in which the plastic sheet has been colored a neutral grey with a solution which includes Capracyl Black N dyestuff and a dyestuff selected from the group consisting of Capracyl Blue G dyestuff and Anthraquinone Blue SWF dyestuff.

References Cited in the file of this patent

UNITED STATES PATENTS

| | | |
|---|---|---|
| 2,188,160 | Rooney et al. | Jan. 23, 1940 |
| 2,260,543 | Smith | Oct. 28, 1941 |
| 2,308,732 | White | Jan. 19, 1943 |
| 2,445,774 | Gorn | July 27, 1948 |
| 2,461,464 | Aronstein | Feb. 8, 1949 |
| 2,476,619 | Nicoll | July 19, 1949 |
| 2,481,622 | Rosenthal | Sept. 13, 1949 |
| 2,567,714 | Kaplan | Sept. 11, 1951 |
| 2,606,241 | Steinke | Aug. 5, 1952 |
| 2,609,269 | Ryan et al. | Sept. 2, 1952 |
| 2,655,452 | Barnes et al. | Oct. 13, 1953 |
| 2,690,554 | Wolf | Sept. 28, 1954 |

FOREIGN PATENTS

| | | |
|---|---|---|
| 706,190 | Great Britain | Mar. 24, 1954 |

OTHER REFERENCES

Publication I: Journal of the Society of Dying and Colouring, pages 306–310, an article "The Colouring of Plastics," by Oehlcke. Dec. 1945. (Copy Div. 45).

Publication II: The Technical Bulletin, Dec. 1951, a publication titled the "Coloration of Plastics," pages 203–222. Published by the Dupont Co. (Copy in Div. 45).